Figure 1:
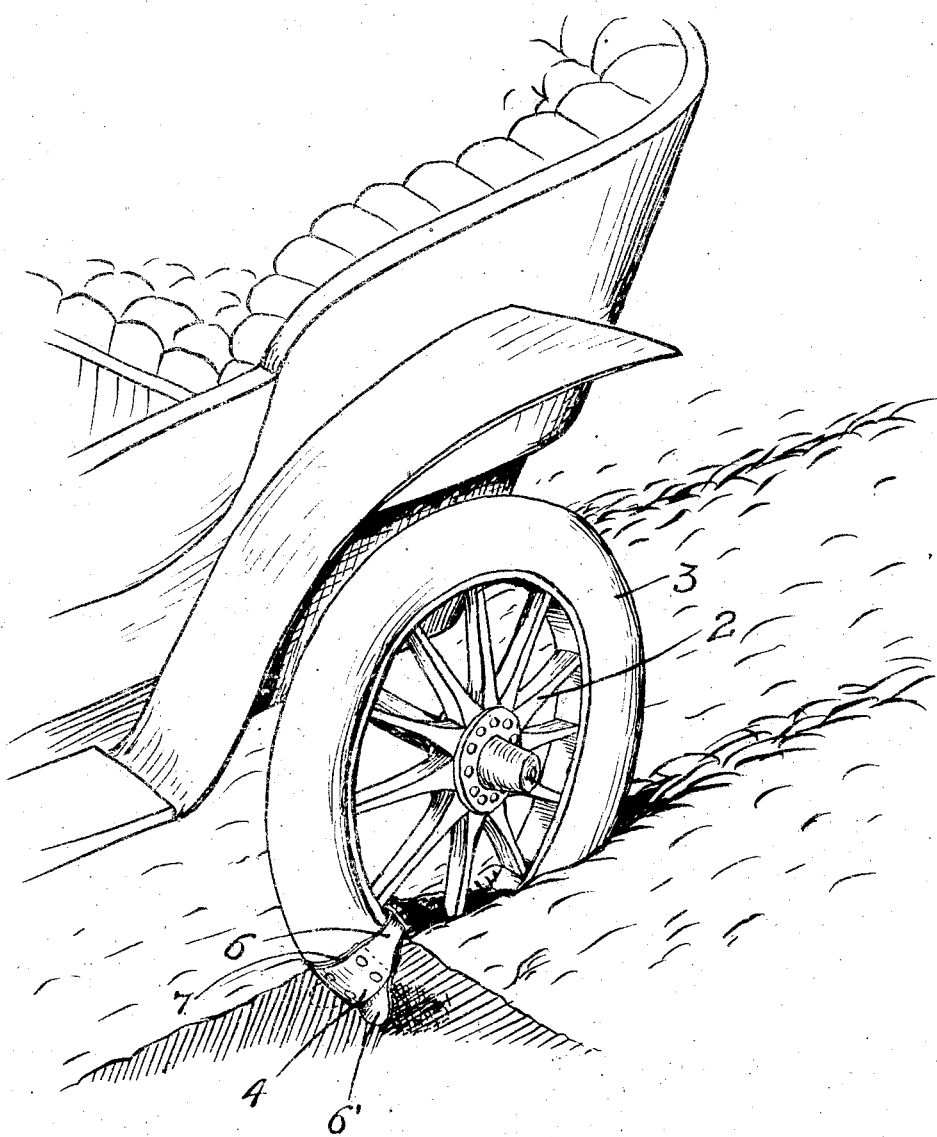

W. P. SHATTUCK.
DETACHABLE SHOE FOR SELF PROPELLED VEHICLE WHEELS.
APPLICATION FILED APR. 22, 1907.

No. 901,842.

Patented Oct. 20, 1908.
2 SHEETS—SHEET 1.

WITNESSES

INVENTOR
WILLIAM P. SHATTUCK
BY Paul & Paul
HIS ATTORNEYS

W. P. SHATTUCK.
DETACHABLE SHOE FOR SELF PROPELLED VEHICLE WHEELS.
APPLICATION FILED APR. 22, 1907.
901,842.
Patented Oct. 20, 1908.
2 SHEETS—SHEET 2.
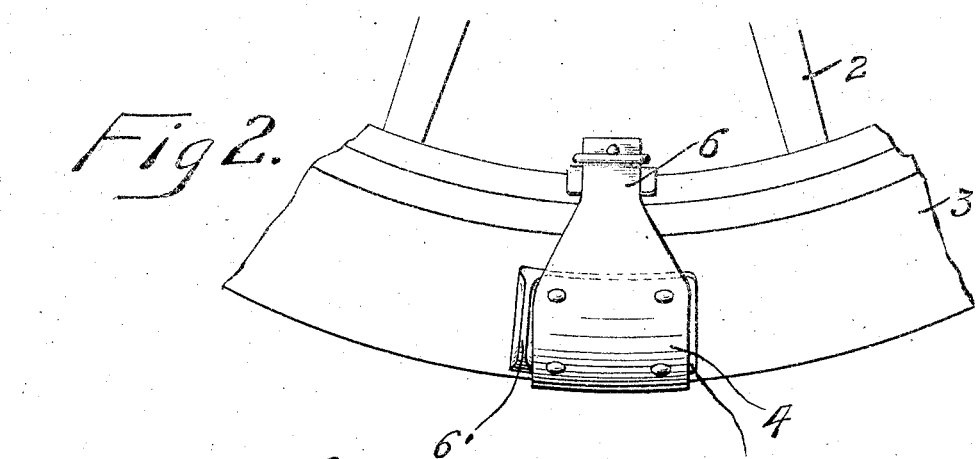
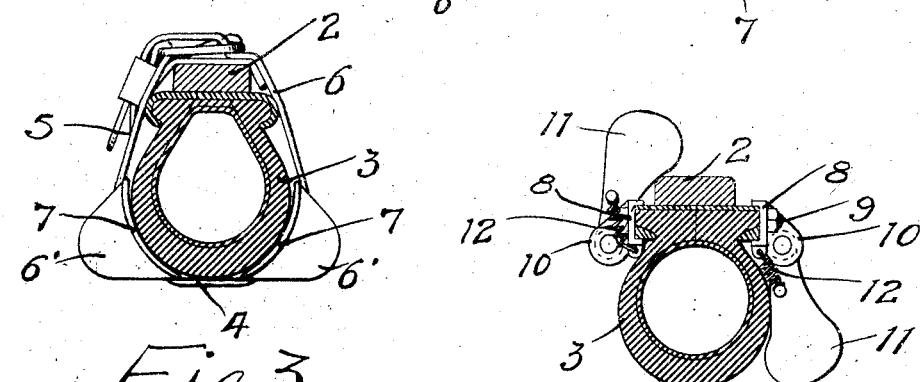
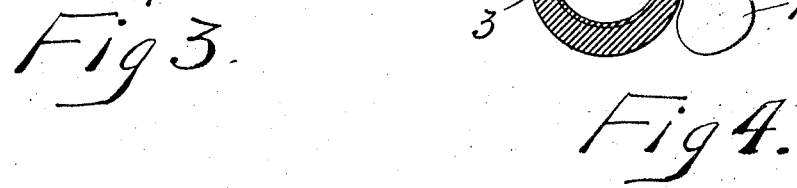
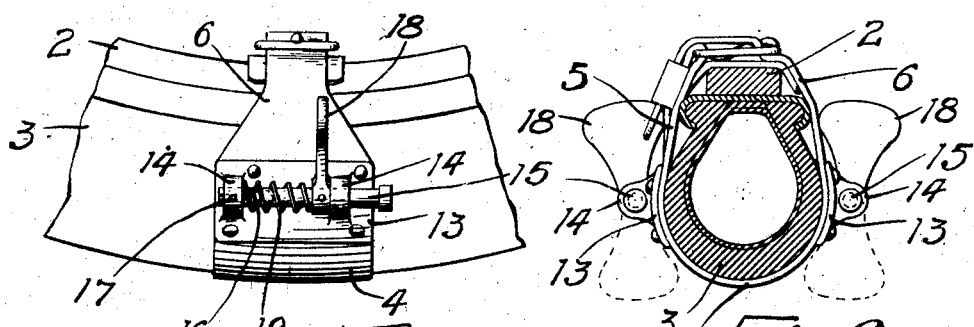
WITNESSES
INVENTOR
WILLIAM P. SHATTUCK
BY Paul & Paul
HIS ATTORNEYS

UNITED STATES PATENT OFFICE.

WILLIAM P. SHATTUCK, OF MINNEAPOLIS, MINNESOTA, ASSIGNOR OF ONE-HALF TO M. McVOY, JR., OF NEW YORK, N. Y.

DETACHABLE SHOE FOR SELF-PROPELLED-VEHICLE WHEELS.

No. 901,842.　　　Specification of Letters Patent.　　　Patented Oct. 20, 1908.

Application filed April 22, 1907. Serial No. 369,674.

*To all whom it may concern:*

Be it known that I, WILLIAM P. SHATTUCK, of Minneapolis, Hennepin county, Minnesota, have invented certain new and useful Improvements in Detachable Shoes for Self-Propelled-Vehicle Wheels, of which the following is a specification.

In the operation of a self-propelled vehicle, particularly of the automobile type, great difficulty is experienced in driving the machine over muddy roads owing to the fact that the wheels will cut deep into the mud through the weight of the car and engine, and when buried partially or completely to the hubs, will slip and revolve when the power is applied, there being insufficient friction between the tire and the mud to roll the wheels and cause propulsion of the car. At such times the driver of the car is obliged to lift the wheels out of the mud or wrap some material on the tire for the purpose of increasing the friction or traction to such an extent that the wheel will grip the soil and roll rather than revolve through it. It is, of course, difficult and annoying to attempt to attach anything to the wheel tire when once in the midst of a bed of mud, and furthermore, any device wrapped around the tire should be removed after the mud is passed, otherwise the wheel will bump with each revolution on hard ground and cause uneven riding or jolting of the car and possible damage to the rim of the wheel.

The object, therefore, of my invention is to provide means capable of quick and convenient attachment to the wheel tire to prevent slipping of the wheel when immersed in mud and allow rolling of the wheel on hard ground without a bump or jolt.

My invention consists generally in a propelling means and means for detachably securing it to the wheel tire.

Further, the invention consists in providing a propelling means located normally above the tread of the wheel and hence out of contact with the soil except when the wheel sinks into it.

Further, the invention consists in a propelling device that is capable of attachment to the tire when the wheel is partially buried in the mud or sand.

In the accompanying drawings, forming part of this specification, Figure 1 is a perspective view illustrating my invention in use. Fig. 2 is a side view of a portion of a wheel rim showing the position of the shoe thereon. Fig. 3 is a transverse sectional view of the tire and rim, showing the arrangement of the propeller blades. Fig. 4 is a sectional view illustrating a modified construction. Fig. 5 is a side view showing another modification. Fig. 6 is a sectional view of the form of propelling device shown in Fig. 5.

In the drawing, 2 represents an automobile wheel having a pneumatic tire 3. The drawing illustrates a rear wheel sinking into the mud through the weight of the car and in this position the wheel would have a tendency to slip and revolve without having sufficient traction to lift the car and propel it forward. The same would be true if the wheel should be correspondingly sunk down in a sandy road.

4 is a shoe of flexible material, preferably leather, having straps 5 and 6 at the sides of the tire adapted to pass around the rim between the spokes and secure the shoe in place snugly against the tread of the wheel. The shoe is comparatively thin and flexible so that when the wheel is running over hard ground, no jolt or bump would be noticeable and as it strikes the surface over which the wheel is passing it will yield and adjust itself to the tread of the tire without affecting its resiliency. It is practicable therefore, to leave the device on the wheel, and it may be desirable to do so where muddy or sandy stretches of road are so frequently met with that the driver does not care to go to the trouble of detaching the shoe between them. In case, however, the car passes a muddy or sandy spot and it seems probable that no other similar place will be met with for a considerable distance, the shoe may be removed entirely from the wheel. This, however, is entirely optional with the driver, as no objectionable jolt or jar would be noticed by the occupants of the car if the shoe should be left on the wheel.

Upon the shoe, located, preferably, between the center of the tread and the point where the tire abuts the edges of the rim, I provide laterally extending blades 6' projecting outwardly beyond the sides of the tire in planes substantially at right angles thereto. These blades or wings, as they may be designated, are preferably of metal, though any other suitable material may be used, and are adapted to drive or compress the mud or other material ahead of them as they revolve with the wheel and pack it to such an extent that sufficient resistance to their progress will be produced to form abutments on each side of the wheel and cause it to be lifted and rolled forward to propel the car.

The blades, as noted, do not extend entirely under the tread of the tire, but are preferably formed on curved plates 7 which fit the surface of the tire on each side and are secured to the flexible shoe 4 and are adapted to swing upwardly through the yielding of the flexible shoe between them to allow the tread of the tire to strike the ground without riding on the ends of the blades. In other words, the weight of the car will tend to spread or separate the blades, the shoe bending sufficiently to permit the blades to swing outwardly and upwardly as the tire is compressed, and allow the load to be sustained by the tread of the wheel.

The location of the blades with respect to the tread of the tire is such that they will not contact with the soil until the wheel sinks below the normal tread. It is not, therefore, necessary to remove the shoe when running over hard ground and no damage will result to the tire or the rim, nor will there be any disagreeable or annoying bumping from the projection of the blades beyond the periphery of the tire.

The shoe is capable of attachment to any size of tire and will fit snugly thereon regardless of the degree of inflation. While the straps afford means for effectually holding the shoe in place they do not in any degree affect the resiliency of the tire but permit it to accommodate itself to the ground over which the wheel is rolling, in the same manner as it would if the shoe were not attached. The shoe being attached at one point only on the wheel, can be put in place even after the wheel has settled down in the mud and can be removed with equal facility. The shoes may be placed at any desired intervals on the wheel, several of them being used on a tire if desired, and indeed the same principle may be utilized in a shoe that completely encircles the tire. Such a construction would not, however, permit the convenient placing of the shoe on the wheel when the machine was stalled.

Instead of having the propelling blades on each side and near the tread of the wheel, I may provide plates 8 secured by bolts 9 to the rim on each side thereof and having ears 10 whereon wings or blades 11 are pivoted and adapted to swing down on each side of the tire or be turned to an upright position above the tire. Springs 12 are attached to said wings and to the plates 8, and tend to hold the blades in either of the said positions, according to the position of the springs.

In Fig. 4 I have illustrated one blade in its down position with the spring swung past the center and the other blade in its up position with its spring swung to a point above the center of the plate pivot. Upon approaching a muddy stretch of road the blades may be swung down to an operative position where they will engage the material on each side of the wheel and prevent it from slipping. Upon leaving the mud the blades may be swung to an upright inoperative position.

In Figs. 5 and 6 I have illustrated still another modification, which consists in providing the flexible shoe substantially as shown in Figs. 2 and 3 and having plates 13 secured thereon and provided with lugs 14 wherein a shaft 15 is mounted, said shaft having a spiral groove 16 adapted to receive a pin 17 and carrying blades 18 which, when pressure is applied thereto, will swing down to the position indicated by dotted lines in Fig. 6. A spring 19 tends to return the shaft 15 to the position shown in Fig. 5 with its blade in a raised position. The shoe on the other side of the tire will be equipped in a similar manner.

Various other modifications in the shape and manner of mounting the propelling blades may be devised, and if preferred, a series of blades may be arranged one in front of the other on each side of the wheel tread. Such modifications, however, would be obvious and entirely within the scope of my invention.

I claim as my invention:

1. The combination, with a wheel and its tire, of a flexible shoe and means for securing it to the tire, metallic plates secured to said shoe on each side of the center line of the tread of the tire, said shoe being adapted to yield between said plates and allow them to conform to the compression of the tire, and propelling blades mounted on said plates and adapted to engage the soil as the wheel revolves, and pack it ahead of them on each side of the wheel, for the purpose specified.

2. The combination, with a wheel and a tire thereon, of a shoe composed of flexibly connected sections adapted to fit the tread of the tire and having means for detachably connecting it to the wheel, and laterally projecting wings carried by said shoe and having comparatively broad bearing surfaces at right angles substantially to the plane of the wheel, which surfaces engage the soil and pack it ahead of said wings, whereby rotary slippage of the tire will be prevented.

3. An emergency shoe for temporarily increasing the traction of a mechanically rotated vehicle wheel, comprising a flexible band adapted to encircle and be detachably connected to the tire and rim of the wheel, between the spokes of the latter, and a plate carried by said band and having a laterally projecting wing normally disposed when said shoe is in use between the normal tread of said wheel and hub thereof said wing having a flat face adapted to engage the soil and resist the rotary slippage of the wheel when the latter sinks into the soil of the roadway.

4. An emergency traction-increasing shoe for a mechanically driven vehicle wheel, comprising a soil-engaging wing having a flat face adapted to resist the rotary slippage of the wheel when the latter sinks into the soil of the roadway, and means for connecting said wing to the wheel with its lowermost edge arranged between the normal tread of the tire and the hub of the wheel and with the plane of the wing at right angles to the plane of the wheel.

5. An emergency traction-increasing shoe for a mechanically driven vehicle wheel, comprising a flexible band adapted to encircle and to be detachably connected to the tire and rim of the wheel between spokes thereof, and a plate carried by said flexible band and having a concave surface conforming to the shape of the tire on the wheel, said plate having a soil-engaging wing arranged to extend, when the shoe is in use, in a plane at right angles to the plane of the wheel, and adapted to resist the rotary slippage of the wheel when the latter sinks into the soil of the roadway.

In witness whereof, I have hereunto set my hand this 21st day of February 1907.

WILLIAM P. SHATTUCK.

Witnesses:
J. H. BALDWIN,
J. B. ERA.